United States Patent
Caprioli et al.

(10) Patent No.: US 8,185,692 B2
(45) Date of Patent: May 22, 2012

(54) UNIFIED CACHE STRUCTURE THAT FACILITATES ACCESSING TRANSLATION TABLE ENTRIES

(75) Inventors: Paul Caprioli, Santa Clara, CA (US); Gregory M. Wright, Mountain View, CA (US)

(73) Assignee: Oracle America, Inc., Redwood Shores, CA (US)

( * ) Notice: Subject to any disclaimer, the term of this patent is extended or adjusted under 35 U.S.C. 154(b) by 576 days.

(21) Appl. No.: 12/367,828

(22) Filed: Feb. 9, 2009

(65) Prior Publication Data

US 2010/0205344 A1    Aug. 12, 2010

(51) Int. Cl.
  *G06F 12/00*    (2006.01)
(52) U.S. Cl. ............ 711/118; 711/123; 711/205
(58) Field of Classification Search .......... None
  See application file for complete search history.

(56) References Cited

U.S. PATENT DOCUMENTS 6,480,950 B1 *  11/2002  Lyubashevskiy et al. .... 711/206
2005/0198466 A1 *  9/2005  Estlick et al. ................. 711/207

* cited by examiner

*Primary Examiner* — Shawn X Gu
(74) *Attorney, Agent, or Firm* — Park, Vaughan, Fleming & Dowler LLP; Mark Spiller

(57) ABSTRACT

One embodiment provides a system that includes a processor with a unified cache structure that facilitates accessing translation table entries (TTEs). This unified cache structure can simultaneously store program instructions, program data, and TTEs. During a memory access, the system receives a virtual memory address. The system then uses this virtual memory address to identify one or more cache lines in the unified cache structure which are associated with the virtual memory address. Next, the system compares a tag portion of the virtual memory address with the tags for the identified cache line(s) to identify a cache line that matches the virtual memory address. The system then loads a translation table entry that corresponds to the virtual memory address from the identified cache line.

20 Claims, 8 Drawing Sheets

UNIFIED CACHE STRUCTURE THAT FACILITATES ACCESSING TRANSLATION TABLE ENTRIES

BACKGROUND

1. Field

This disclosure generally relates to the design of a unified cache structure. More specifically, this disclosure relates to accessing a translation table entry from a unified cache that can simultaneously store program instructions, program data, and translation table entries.

2. Related Art

Computer memory is typically divided into a set of fixed-length blocks called "pages." An operating system can give a program which is accessing such pages the impression that it is accessing a contiguous address space that is larger than the actual available physical memory by using a virtual memory abstraction. During operation, the operating system and hardware of the computing device translate virtual addresses accessed by the program into physical addresses in the physical memory.

Accessing a virtual address typically involves using specialized translation hardware that uses a translation table entry (TTE) to determine a corresponding physical memory address. Unfortunately, while the typical physical memory size of computing devices has grown significantly in recent years, the need to remain compatible with existing software has restricted page sizes to page sizes chosen years ago. For instance, the common page sizes of 4 KB and 8 KB are very small in comparison to the size of a typical physical memory. The combination of small page sizes and large memory sizes results in a large number of TTEs, especially for high-end systems that support multiple terabytes of physical memory. Moreover, the specialized translation hardware typically cannot cache all of the TTEs in use, and the overhead of loading a required TTE into cache can be high. Furthermore, the specialized hardware structures and associated software involved in handling TTE "misses" can be quite complex.

Hence, what is needed are hardware structures and techniques for managing TTEs without the above-described problems of existing techniques.

SUMMARY

One embodiment provides a system that includes a processor with a unified cache structure that facilitates accessing translation table entries (TTEs). This unified cache structure can simultaneously store program instructions, program data, and TTEs. During a memory access, the system receives a virtual memory address. The system then uses this virtual memory address to identify one or more cache lines in the unified cache structure which are associated with the virtual address. Next, the system compares a tag portion of the virtual memory address with the tags for the identified cache line(s) to identify a cache line that matches the virtual memory address. The system then loads a translation table entry that corresponds to the virtual memory address from the identified cache line.

In some embodiments, the tags in the unified cache structure include information from both the virtual address and a context. This information facilitates confirming that the cache line contains TTEs that match a current processor and/or address space context. During a memory access, the system compares data for the current context with the tag(s) of the identified cache line(s).

In some embodiments, the data portion of a cache line can contain: 1) one or more consecutive translation table entries; or 2) program instructions and/or program data. In some embodiments, the system determines the location of a TTE in a cache line by using one or more bits of the virtual address as an index into the one or more consecutive translation table entries that are stored in the data portion of the cache line.

In some embodiments, the system can access program instructions and/or program data from the unified cache structure by: 1) translating the virtual memory address into a physical address; 2) using the physical address to identify a cache line; and 3) loading data from the identified cache line.

In some embodiments, if no cache line matches the virtual memory address (and/or current processor context), the system: 1) creates a new TTE for the virtual memory address; 2) identifies a cache line that will store the new TTE; and 3) writes the new TTE to that cache line.

In some embodiments, the tag for a cache line containing TTEs (referred to as a "TTE cache line") differs in format from a tag for a cache line that contains program instructions and/or program data. Hence, writing a tag for a TTE cache line involves using one or more special store instructions for TTEs.

In some embodiments, the system may update one or more TTEs in a given TTE cache line individually. To ensure that an accessed TTE is valid, the system may include a valid bit for each TTE in the TTE cache line.

In some embodiments, the system automatically balances the portions of the unified cache structure which are dedicated to program instructions, program data, and TTEs based on access patterns.

In some embodiments, the system uses the unified cache structure in conjunction with a first-level processor cache for TTEs. Note that using the unified cache structure to store TTEs facilitates eliminating a dedicated memory management unit for TTEs.

In some embodiments, using the unified cache structure to store a short-lived TTE prevents the short-lived TTE from ever being written to memory.

In some embodiments, if the cache line containing a TTE is evicted from the unified cache structure, the system can: discard the cache line and then later regenerate the TTE(s); or, store the cache line in a dedicated area of memory that is reserved for storing TTEs that are evicted from the unified cache structure.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Managing Translation Table Entries using a Memory Management Unit

Figure 1:
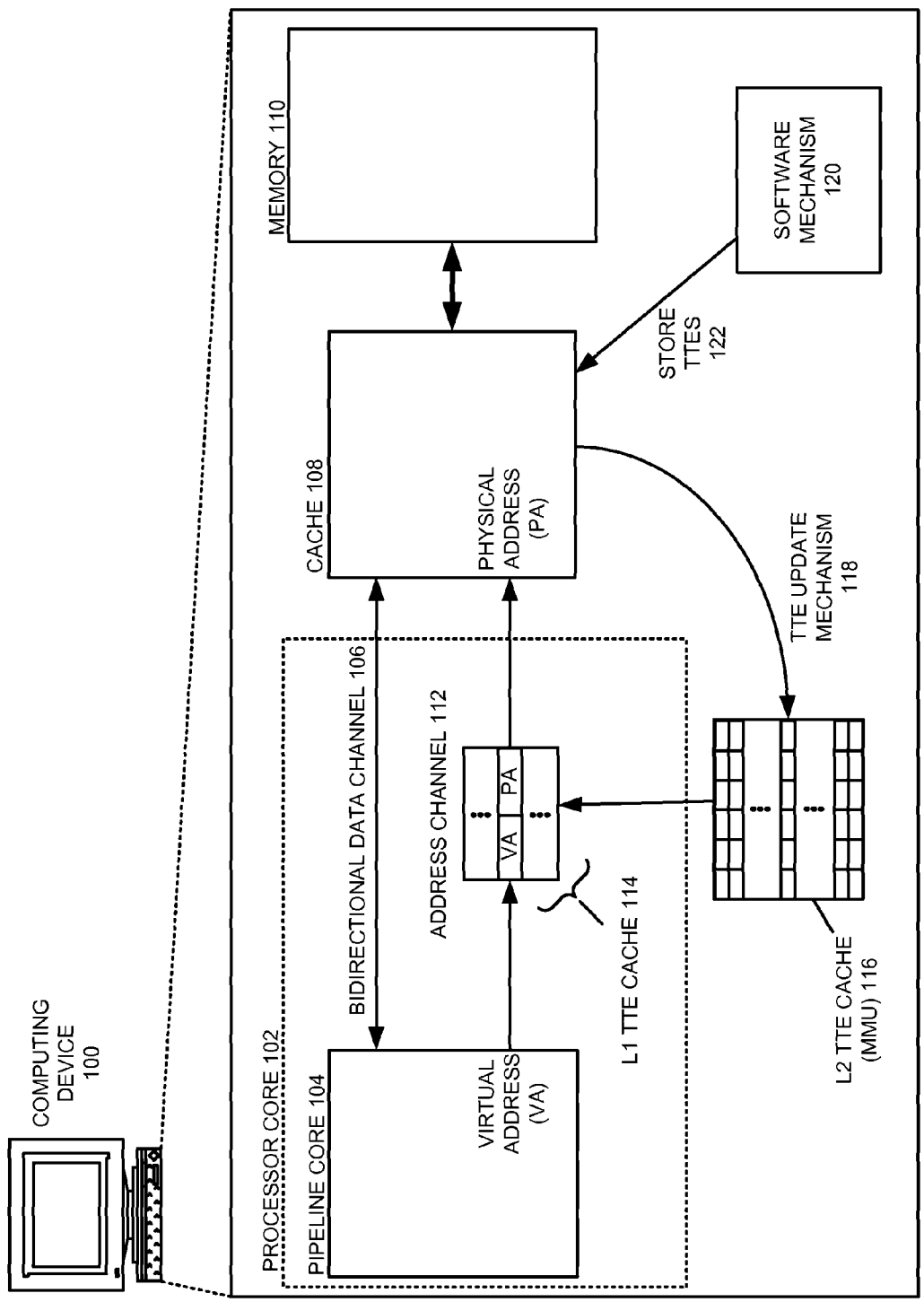
FIG. 1 illustrates an exemplary computing device that includes a conventional set of structures for loading and managing translation table entries.

FIG. 1 illustrates an exemplary computing device 100 that includes a conventional set of structures for loading and managing translation table entries (TTEs). Processor core 102 includes a pipeline core 104 that executes program instructions. Instructions that perform memory accesses (e.g., loads and stores) use a bidirectional data channel 106 to move data between processor core 102 and a memory hierarchy that includes (conventional) cache 108 and memory 110. Note that computing device 100 may include multiple levels of cache structures. For instance, computing device 100 might include: 1) a small, fast first-level cache (not shown) in processor core 102 and a larger second-level (L2) cache (cache 108); or 2) only a single cache (cache 108).

Computing device 100 also includes a second set of cache structures that are used to determine a physical memory address to be accessed. Instructions executing in pipeline core 104 access virtual memory addresses (also referred to simply as virtual addresses, or VAs), which need to be translated into physical memory addresses (also referred to simply as physical addresses, or PAs) for cache 108 and memory 110. Computing device 100 includes translation tables that map VAs to PAs, wherein translation table entries (TTEs) contain a mapping from a virtual page to a physical page. During a memory access, processor core 102 compares a subset of the bits in a VA with one or more TTEs to determine a corresponding physical address for the VA. For example, the system can use a subset of the bits in the VA to find a matching TTE, and then use physical page information from the TTE to calculate the corresponding PA. This PA is then used to access the referenced memory location (either in cache 108 or memory 110).

High instruction throughput for a processor typically requires the rapid translation of memory addresses. Hence, the address translation process may include a number of specialized hardware structures that attempt to manage and speed up access to TTEs. For instance, in a conventional architecture, address channel 112 may store TTEs in: 1) first-level (L1) TTE cache 114; 2) second-level (L2) TTE cache 116 (also referred to as a memory management unit, or MMU); and 3) cache 108. L1 TTE cache 114 is often included inside processor core 102, and while very fast, is limited in size. L2 TTE cache 116 is typically larger than L1 TTE cache 114, and more fully associative, but is often slower than L1 TTE cache 114. Cache 108 is larger still, but also stores program instructions and program data, and hence is not dedicated to storing only TTEs. Note that while caches 114, 116, and 108 differ in size and other characteristics, all three caches are typically located on the same chip. During operation, when a TTE that is needed for an address translation is not found ("misses") in L1 TTE cache 114, specialized hardware and/or software mechanisms (e.g., TTE update mechanism 118) load the TTE (as needed) from L2 TTE cache 116 and/or cache 108 to L1 TTE cache 114, thereby allowing the translation to proceed. These mechanisms may range from an autonomous engine that automatically loads TTEs to a trap handler that explicitly triggers micro-coded lookups that update the TTE caches.

New TTEs are typically created using software instructions, for instance at the time a user program begins executing (or in a trap handler). The software creating new TTEs may execute on processor core 102 (e.g., after a context switch) or another processing core in computing device 100. For instance, another processing core may execute software mechanism 120 to create TTEs, and then store the new TTEs 122 to a shared cache (cache 108), a page table and/or a translation storage buffer (TSB) using conventional loads and stores. After a needed TTE has been created and stored (or loaded) into cache 108, TTE update mechanism 118 loads the TTE into L2 TTE cache 116 and then into L1 TTE cache 114, at which point processor core 102 can complete the needed VA translation and can resume normal execution. Note that the TTE load path from cache 108 to L1 TTE cache 114 is unidirectional; while new TTEs can be written to cache 108 by software mechanism 120, L1 TTE cache 114 and L2 TTE cache 116 will never modify and write TTE entries back to cache 108. Instead, these TTE caches can simply discard a TTE when it is no longer needed or when another TTE needs the space occupied by the first TTE. If an evicted TTE is needed again, the system reloads the TTE from L2 TTE cache 116 and/or cache 108. If the TTE is no longer available in either of these caches, the system re-generates the TTE using software mechanism 120.

As described previously, typical physical memory sizes have grown, while page sizes have been constrained to historical sizes to maintain program compatibility. As a result, the number of TTEs used during normal program execution has grown, especially for programs that traverse memory quickly. Unfortunately, systems will continue to need to support such smaller page sizes as long as a significant percentage of applications and/or operating systems require their use. While reasonably sized on-chip MMU structures may have thousands of entries, they often cannot contain all of the TTEs that are in use, and the cost of an MMU miss is quite significant. For instance, filling a TTE cache using hardware mechanisms (such as a table-walk hardware search for a TTE) may involve requesting the TTE data from the L2 cache, which in turn may need to evict useful program data from the cache to store a new TTE. Filling an MMU using a mechanism that takes a trap to software also involves additional overhead in vectoring to and returning from the trap handler.

In the above-described conventional design, all of the TTEs stored in the MMU have passed through, and may also still be in, the data cache (cache 108). Embodiments of the present invention eliminate the need for a separate L2 TTE cache structure by integrating the functionality of the L2 TTE cache into a unified cache structure from which the system can directly access program instructions, program data, and TTEs.

Unified Cache Structure

In one embodiment of the present invention, a unified L2 cache reduces inefficiency and redundancy by caching both TTEs and "normal" data (e.g., program instructions and program data) in a single, dynamically shared hardware resource.

Figure 2A:
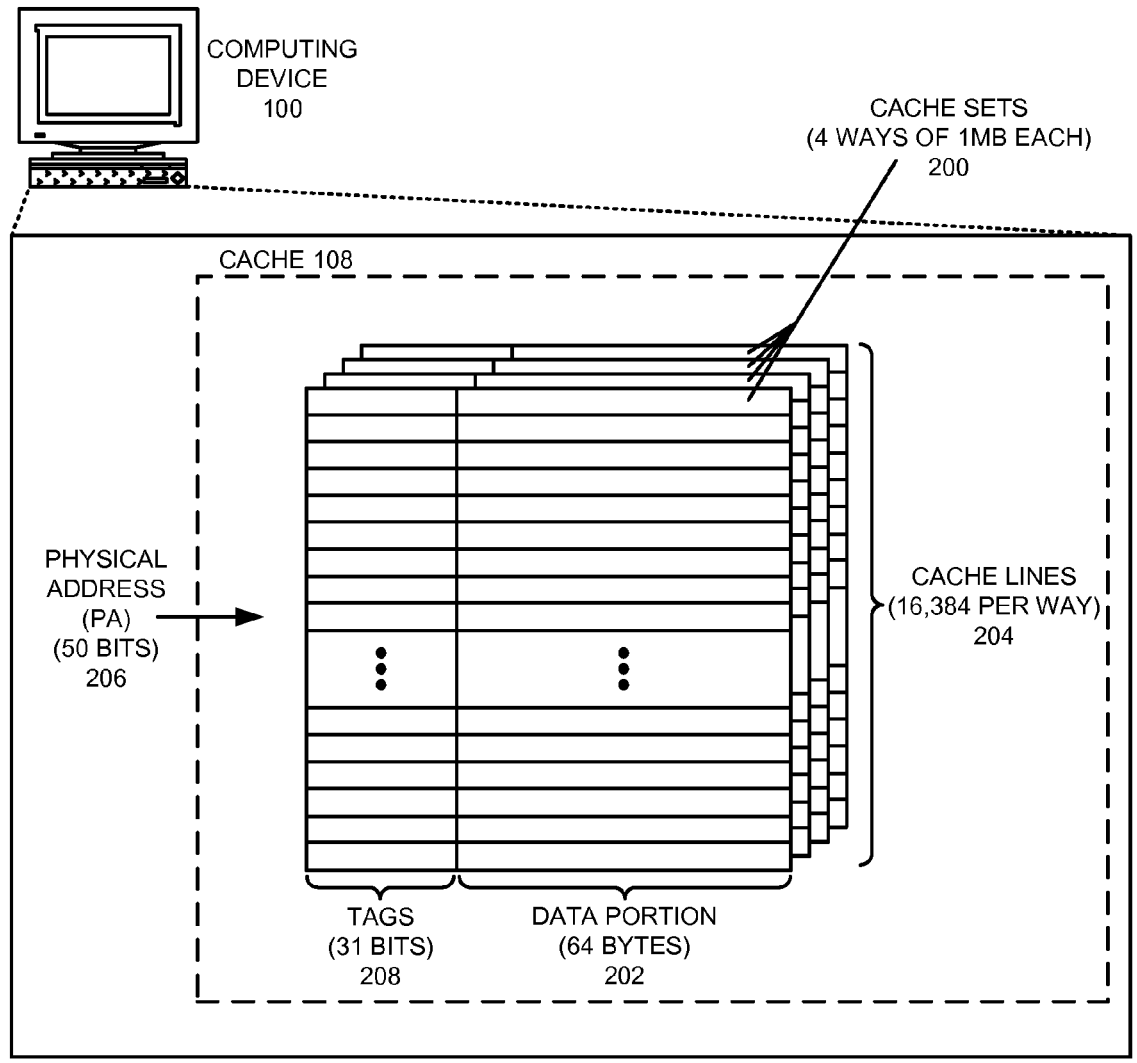
FIG. 2A illustrates a conventional cache.
Figure 2B:
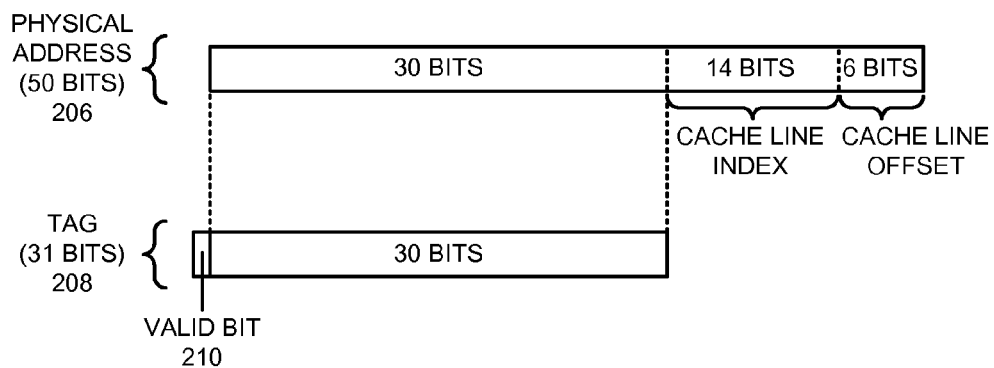
FIG. 2B illustrates the set of bits of a physical address that are compared to a cache tag in a conventional cache.

FIGS. 2A-2B illustrate the organization of a conventional cache design. This and subsequent examples assume that:
  virtual addresses (VA) are 64 bits wide;
  physical addresses (PA) are 50 bits wide;
  an L2 cache is physically indexed and tagged;
  the data array for the cache is 4 MB in size;
  the data portion of a cache line is 64 bytes in size;
  the cache is 4-way set associative (i.e., four ways of 1 MB each, comprising 16,384 sets of 4 cache lines each);
  a TTE includes 8 bits of attributes; and
  16 bits of context are used to distinguish VA spaces.

Note that these values are chosen for illustrative purposes only, and that the invention is not limited to caches with these values. For instance, the physical address size is typically determined by the available physical memory size, while the virtual address size and context size are typically determined by an operating system. The below-described structures and techniques can be applied to a wide range of cache sizes and architectures.

FIG. 2A illustrates conventional cache 108 in greater detail. A 4 MB data array is divided into four ways 200 of 1 MB each, thereby comprising 16,384 sets of 4 cache lines (256 bytes) each. Because the data portion 202 of each cache line is 64 bytes, each way has 16,384 cache lines 204, which can be indexed using 14 bits. During a lookup, cache 108 receives a 50-bit physical address (PA) 206, and uses 14 bits of PA 206 as an index into the four ways, thereby identifying four candidate cache lines (e.g., one candidate cache line from each of the four ways). After identifying the four candidate cache lines, cache 108 determines whether an identified cache line is a "hit" by comparing additional bits in PA 206 with a 31-bit tag 208 for each of the identified cache lines.

FIG. 2B illustrates the set of bits for PA 206 that are compared to cache tag 208 for the conventional cache of FIG. 2A. As described above, 14 bits of PA 206 identify four candidate caches lines. If a tag 208 does match for one of the candidate cache lines, six bits of PA 206 (e.g., the cache line offset) are used to determine which of the 64 bytes of the data portion 202 of the cache line to access. Hence, 30 bits of PA 206 (e.g., 50 bits−14 bits−6 bits) are then compared to the tags 208 for these four candidate cache lines to determine if the data for PA 206 is available in the data portion 202 of one of the candidate cache lines. In addition to the 30 address bits, tag 208 also includes valid bit 210, which indicates whether a given cache line has been previously loaded with valid data. Note that the tag array for cache 108 is far smaller than the data array (e.g., 31 bits vs. 64 bytes, with each 31-bit tag corresponding to 512 bits of data). Note also that this and the following examples assume byte-addressed memory addresses. Similar techniques can also be applied to word-addressed memory accesses with some adjustment to field sizes.

Some embodiments of the present invention involve a modified cache structure that facilitates storing either translations or program data in the cache line of the unified cache structure. For instance, a 64-byte cache line may contain eight virtually consecutive TTEs (e.g., with 8 bytes of space for each TTE). In such embodiments, the tag array for the cache may be widened to accommodate managing and accessing TTEs.

Figure 3:
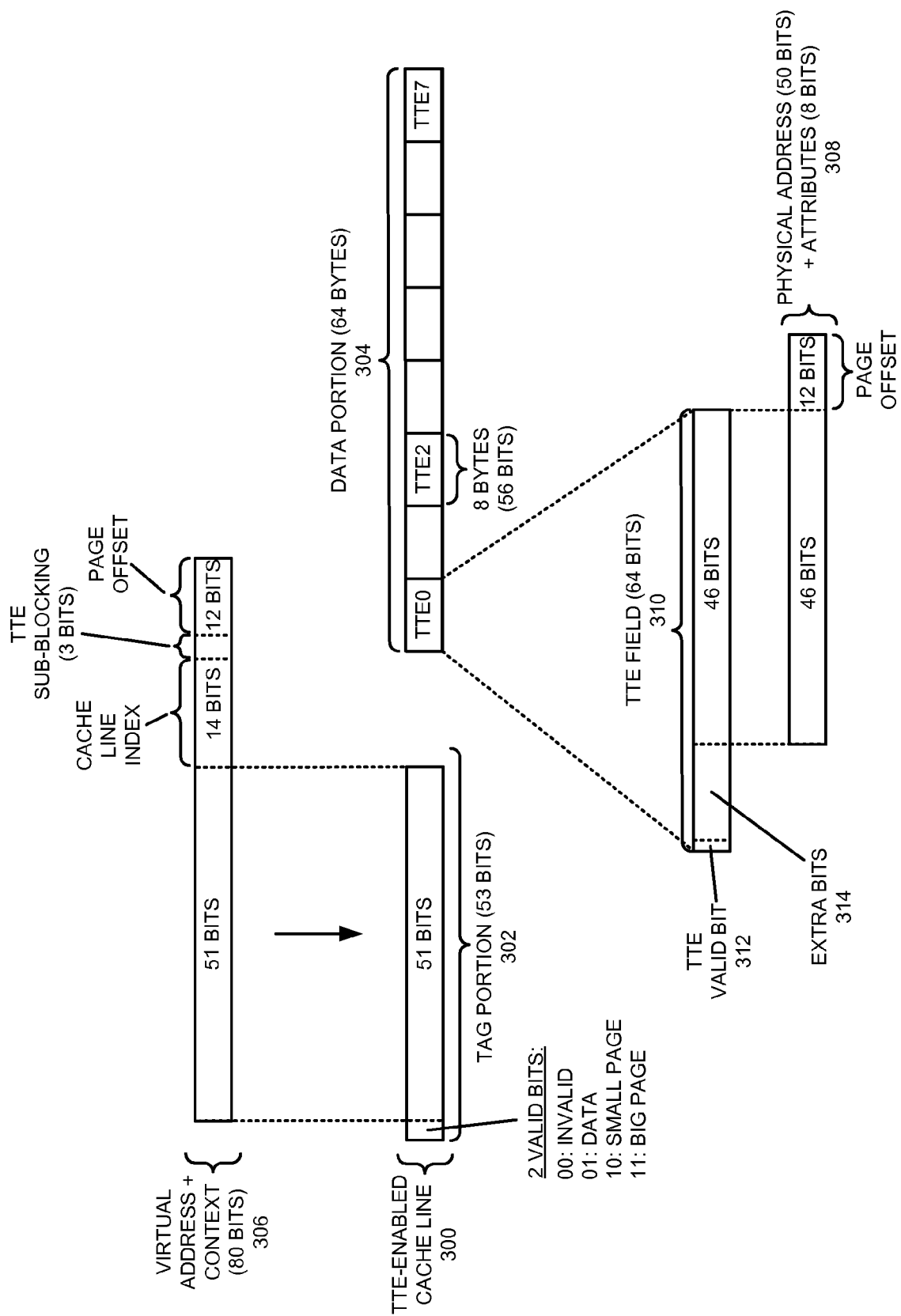
FIG. 3 illustrates a TTE-enabled cache line that can accommodate both TTEs and normal data in accordance with an embodiment of the present invention.

FIG. 3 illustrates a TTE-enabled cache line 300 that can accommodate both TTEs and normal data. Where conventional tag 208 (from FIG. 2) was 31 bits wide, the tag portion 302 of TTE-enabled cache line 300 is now 53 bits wide. Data portion 304 of TTE-enabled cache line 300 remains unchanged in size, and when storing TTEs can store eight bytes of information for each of eight TTEs. Note that this eight-byte field does not need to store all of the information for a TTE, because some of this information is also present in the cache index and tag field.

Because TTEs apply to virtual addresses, the tag for a cache line that stores TTEs needs to include a subset of bits from a virtual address and context associated with the virtual address space. As described above, virtual addresses are 64 bits wide, and 16 bits of context are used to distinguish different virtual address spaces in the computing device, resulting in a combined virtual address and context 306 that is 80 bits wide. As in the previous example, 14 of these bits are used to identify a cache line index, and an additional 12 bits serve as a page offset (assuming 4 KB pages). If eight TTEs can be stored in a cache line, three additional bits are used to determine which of the eight TTEs in the cache line should be used (e.g., for TTE sub-blocking). Therefore, out of the original 80 bits, 51 bits (80 bits−14 bits−12 bits−3 bits) need to be stored in tag portion 302. Furthermore, the unified cache can use two valid bits to indicate whether the cache line is valid and whether the cache line contains normal data or TTEs. Hence, tag portion 302 comprises 53 bits in total. Note that the bits for virtual address and context 306 and the actual bits used in tag portion 302 may be ordered differently than illustrated (e.g., with the cache line index comprising higher-order bits of virtual address and context 306).

Figure 6:
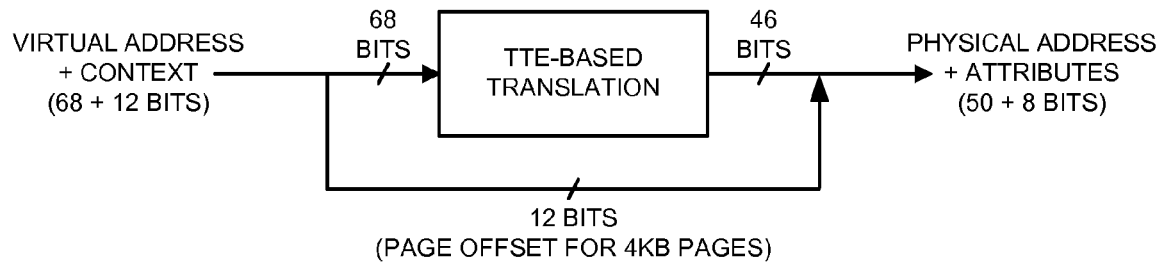
FIG. 6 illustrates translating a virtual address to a physical address in accordance with an embodiment of the present invention.

As mentioned above, for the specified exemplary configuration, data portion 304 includes eight 8-byte TTE fields. The tag associated with these eight TTE fields applies to all eight TTEs in the TTE-line, with three virtual address bits indicating the position of a desired TTE within the TTE-line. The result of an address translation operation requires 58 bits of information 308, specifically a 50-bit PA and eight bits of attributes (e.g., where the attributes specify information such as whether the associated page is readable, writable, and/or executable). The 12 page-offset bits from the VA are taken directly from the VA, and hence do not need to be stored in TTE field 310 (see FIG. 6). The remaining 46 bits needed (50 bits+8 bits−12-bit page offset) for the PA are stored in TTE field 310. Because the virtual pages mapped by TTEs may be loaded and/or accessed individually, only some of the TTEs in a cache line may be valid, and hence each TTE field 310 also includes a TTE valid bit 312. Note that while the VAs associated with the eight TTE fields share tag information and hence need to be consecutive, the PAs associated with the eight TTE fields are not required to be consecutive. Note also that 17 bits remain available in each of the TTE fields. These extra bits 314 can be used for other purposes (see below).

In some embodiments, the system may support multiple page sizes. For instance, the system might support both "small" (e.g., 4 KB) pages as well as "big" (e.g., 2 MB) page sizes. An operating system for the computing device can use heuristics to decide the size of pages for different purposes (e.g., perhaps placing program instructions and stacks, which tend to be smaller, in small pages, and placing larger data sets, such as a global shared array, in big pages). The system may also synthesize additional page sizes. For example, the system could natively support 8 KB and 4 MB pages, and then synthesize these page sizes into halves to also support 4 KB and 2 MB page sizes. To provide such support, the system can use the two valid bits in the tag portion 302 of a TTE-enabled cache line 300 to indicate whether: 1) a given tag and cache line are invalid ("00"); 2) the cache line is valid, and contains normal data ("01"); or 3) the cache line is valid and contains TTEs for small pages ("10") or TTEs for big pages ("11").

Figure 4:
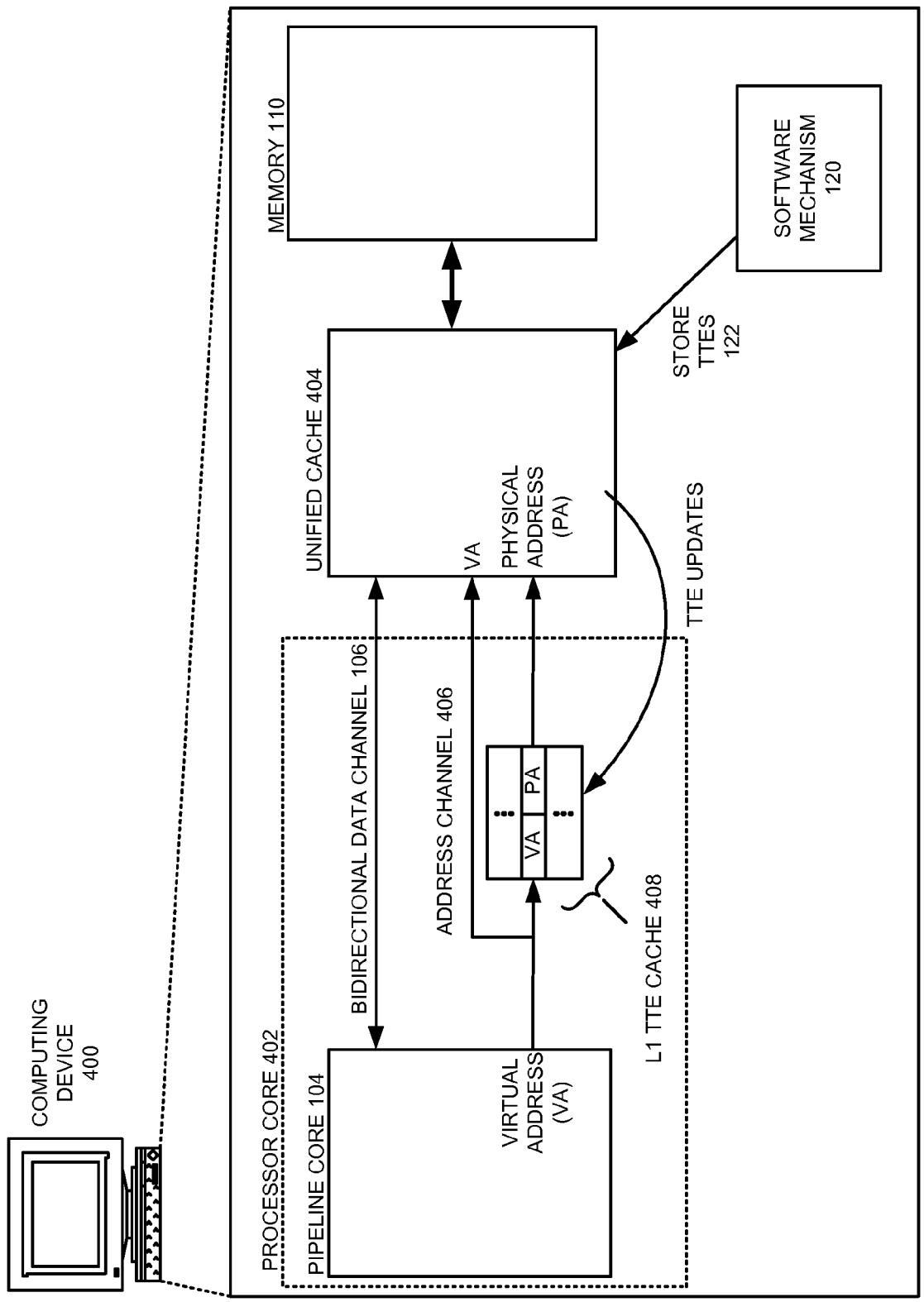
FIG. 4 illustrates an exemplary computing device that includes a processor core that accesses a unified cache in accordance with an embodiment of the present invention.

FIG. 4 illustrates an exemplary computing device 400 that includes a processor core 402 that accesses a unified cache 404. The cache lines of unified cache 404 can contain TTEs as well as program instructions and program data, and address channel 406 does not include an L2 TTE cache. Instead, TTEs are loaded into L1 TTE cache 408 directly from unified cache 404. Note that the above-described TTE cache lines include portions of a virtual address, and hence address channel 406 needs to be able to provide both PAs (for normal data accesses) and VAs (for TTEs) to unified cache 404. This is different from a conventional cache, which would typically receive only one of a PA (for a physically addressed cache) or a VA (for a virtually addressed cache). For the unified cache, these two addresses can be input into unified cache 404 as two separate address busses (as shown), or via a shared bus. In the latter case, a single bit may indicate whether the source of the request was the L1 TTE cache 408 (in which case the address bus holds a VA) or an L1 data cache (not shown) (in which case the address bus holds a PA).

Figure 5:
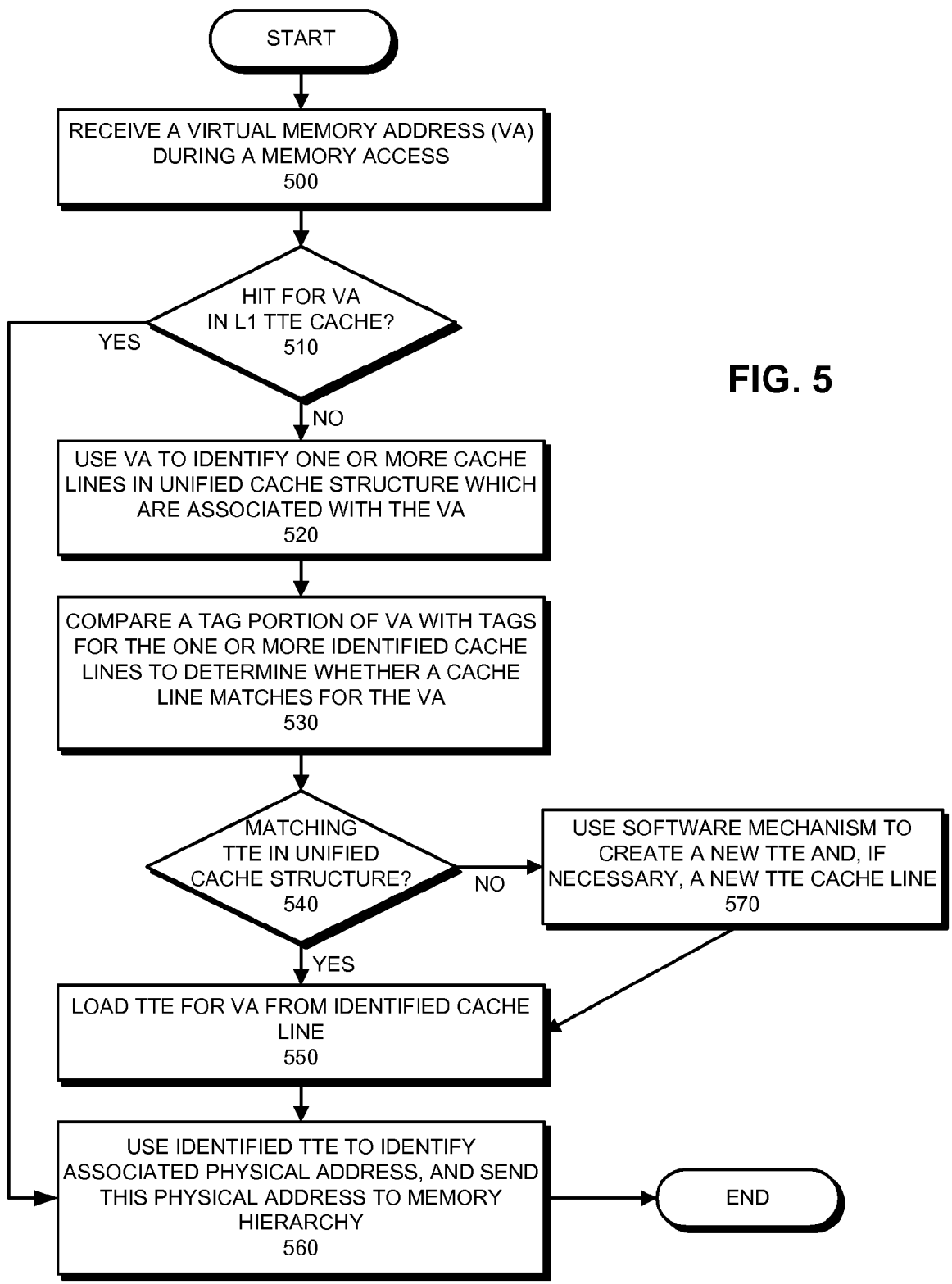
FIG. 5 presents a flow chart illustrating the process of accessing a translation table entry from a unified cache structure in accordance with an embodiment of the present invention.

FIG. 5 presents a flow chart that illustrates the process of accessing a translation table entry from a unified cache structure that simultaneously stores program instructions, program data, and translation table entries. During a memory access, the system receives a virtual address (operation 500). If a TTE that matches this VA is available in an L1 TTE cache (operation 510), the system uses the TTE to identify an associated physical address, and sends a request to access this physical address to the memory hierarchy (operation 560). If, however, no matching TTE is found in the L1 TTE cache (operation 510), the system uses the VA to identify one or more cache lines in the unified cache structure which are associated with the VA (operation 520) (e.g., the system may compute an index for the VA that maps to one or more sets in the unified cache structure). Next, the system compares a tag portion of the VA with tags for the one or more identified cache lines to determine whether a cache line matches for the VA (operation 530). If a match is found (operation 540), the system loads the TTE for the VA from the identified cache line into the L1 TTE cache (operation 550). The system then uses this loaded TTE to identify an associated physical address for the VA, and sends this physical address to the memory hierarchy (e.g., to the unified cache structure and, if necessary, to the physical memory) (operation 560). If no matching TTE is found in the unified cache structure (operation 540), the system uses a software mechanism to create a new TTE and, if necessary, a new TTE cache line (see the following sections) (operation 570), after which the system can load this newly created TTE into the L1 TTE cache (operation 550) and perform operation 560 as described above.

In some embodiments, determining whether a cache line contains a valid TTE for a VA can involve: 1) confirming that the cache line is valid and contains TTEs by checking the cache line's valid bits; 2) confirming that the tag for the VA matches the tag for the cache line; 3) determining the location of an associated TTE using one or more bits in the VA as an index into the one or more consecutive TTEs in the data portion of the cache line; and/or 4) determining that the valid bit for the indexed TTE is set.

Note that the process of loading program instructions and/or program data from the unified cache structure is substantially similar to loading such data from a conventional physically addressed cache. After using the previously described techniques to determine a TTE for a virtual memory address and successfully translating the virtual memory address into a physical address, the system then presents the physical address to the unified cache structure. The unified cache structure uses the physical address to identify a matching cache line, which includes checking that the valid bits in the cache line tag indicate that the cache line contains data. If the system finds a matching cache line, the instructed memory access can proceed. If no match is found in the cache, the system loads the data from physical memory into a target cache line before proceeding with the memory access.

The cache tags shown in FIGS. 2B and 3 illustrate how a unified cache structure has a larger cache tag size than a conventional cache. In the exemplary architectures illustrated, the tag size grows from 31 bits to 53 bits. Note, however, that the 22-bit increase in tag size is still relatively small compared to the data portion of the cache line (512 bytes), and hence the overall size of the cache only grows by a relatively small amount. Furthermore, eliminating a separate L2 TTE cache that contains redundant data may partially or completely compensate for the increase in tag size.

In some embodiments, the tag width for the unified cache structure can be reduced by: 1) reducing the width of the context that is used to distinguish virtual address spaces; 2) reducing the width of virtual addresses (i.e., creating a hole in the virtual address space); and/or 3) moving some of the tag bits to the data portion of cache lines that contain TTEs. For the third case, the system could first match a portion of the tag from the tag portion of the cache line, and then validate the match by examining the remaining VA and/or context bits which were moved to the data portion of the cache line. In some embodiments, the system could store a hash of the entire VA and context bits in the tag portion to improve the hit rate. In some embodiments, extended tags that support TTE cache lines may only be supported by a limited set of cache ways. In this scenario, the cache ways that do not support TTE cache lines would be limited to holding only data, and hence would have the same tag size as a conventional data cache.

In some embodiments, unifying a data cache and a TTE cache facilitates dynamically sharing a cache hardware resource between normal data and TTEs. For instance, a program accessing data with high spatial locality does not need many translations, and would benefit from most of the unified cache structure being dedicated to holding the data being operated upon. For example, for the above-described architecture, a program operating on a dense matrix with 2 MB of data would perform more efficiently if all of the data were resident in cache, and (for big pages) would only need a small number of page table entries. Alternatively, a program randomly accessing a very large and sparse data set to perform very brief accesses would perform more efficiently if a large percentage of the cache were devoted to translation and page table information. A unified cache structure with a reasonable cache replacement policy facilitates allowing the balance of TTEs and normal data to shift based on the needs and access patterns of the programs being executed. Moreover, if the space saved by eliminating the L2 TTE cache can be used to increase the size of the unified cache structure, the system may benefit from improved performance for both data and TTE accesses (as compared to conventional systems with two separate caches).

Creating TTE Cache Lines

A hypervisor and/or operating system are aware of the address space context, starting VA, and the location (in physical memory) of a new program, but need to make this information available to the hardware performing the translation (e.g., the unified cache and the L1 TTE cache). So, after creating a new address space context for the program, the operating system creates a new TTE for the physical memory address that contains the first instruction for the program. Similarly, the system may also need to create a new TTE on a subsequent translation miss. To create new TTEs, the system calculates the needed translation information in a register, and then stores this information into a properly formatted cache line.

In some embodiments of the present invention, the system includes one or more special instructions that manage TTE-related operations. For instance, the system can include a "store TTE" instruction that receives a virtual address and TTE information, and then writes a properly formatted TTE and tag into a target cache line in the unified cache.

Note that not finding a TTE during an address translation may occur because either: 1) there was no TTE cache line present with a matching tag; or 2) there was a TTE cache line present with a matching tag, but the needed TTE within this matching TTE cache line was not valid. In the first case, the system creates both a new TTE and a new TTE cache line. In the second case, however, the system may only create a new TTE (e.g., in software), and then store this new TTE in the cache in the (already existing) matching TTE cache line.

Figure 7:
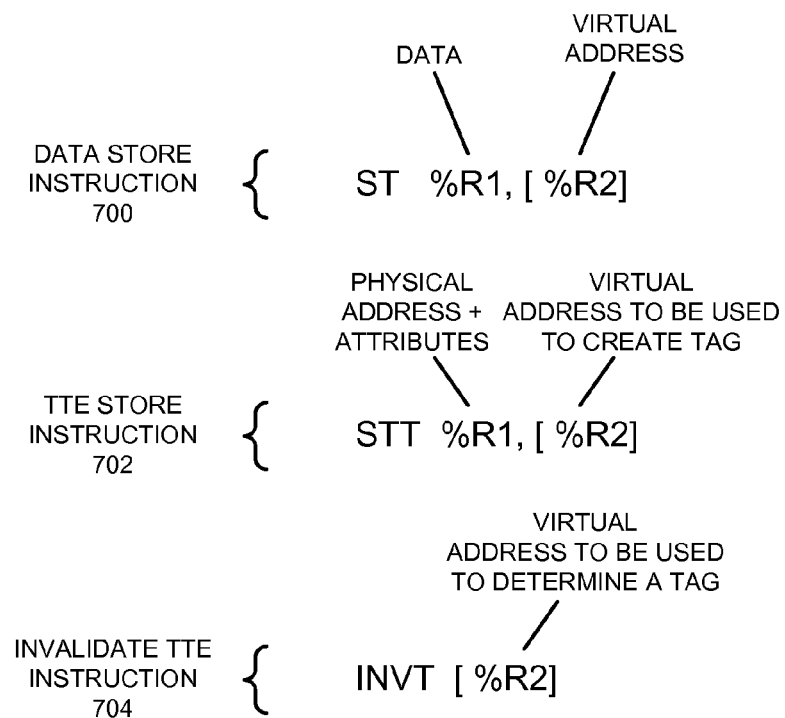
FIG. 7 illustrates a set of instructions that operate upon TTE cache lines in accordance with an embodiment of the present invention.

FIG. 7 illustrates a set of exemplary instructions that operate upon TTE cache lines. A normal data store instruction 700 specifies a data value that should be stored at a specified virtual address. The system automatically performs any needed address translations, and then stores the data at this physical address. TTE store instruction 702 also receives data and address arguments, but instead uses these two register values to write a TTE cache line. The system stores information relating to a physical address and its attributes in R1. The address portion of the instruction is still a virtual address, but instead of using this address as a target for a memory access, the system uses this virtual address to determine a target cache line and to create a virtual address tag for this target cache line. The system automatically generates the needed cache indices, tag, and TTE format, and can evict dirty cache lines (either data cache lines or TTE cache lines) and issue memory requests as needed. Note that the address space context is determined in the same way as in conventional memory operations (e.g., using an immediate field in an instruction or via a context register).

Evicting TTE Cache Lines

TTEs may range in lifespan. For instance, the system might only access a TTE for a very short-lived program (such as "ls," a program that lists the contents of a file system directory) once. In this case, the operating system creates the TTE, the program runs, and the TTE is no longer needed. Alternatively, some other programs may run indefinitely, and need to access a given TTE repeatedly. Over the course of operation, such long-lived TTEs might be evicted from the unified cache structure one or more times.

In some embodiments of the present invention, the system can create short-lived TTEs that are stored directly in the unified cache structure from which they will be accessed and which never need to be written to physical memory. For instance, after a short-lived program has executed, its TTE may be automatically discarded by a least-recently-used (LRU) cache replacement policy. Alternatively, the operating system may explicitly invalidate the TTE after the short-lived program completes. For instance, the operating system may execute an explicit invalidate instruction that invalidates the TTE for a specified virtual address (e.g., invalidate TTE instruction 704 in FIG. 7). The ability to invalidate TTEs prevents unneeded memory writes for TTEs that will no longer be used, which can provide performance benefits.

Depending on the workload, some long-lived TTEs may also live their entire lifespan in the unified cache, and never need to be stored in memory. However, in some cases long-lived TTEs may be evicted from the unified cache. The system can manage the eviction of long-lived TTEs in several ways. One option is simply to discard evicted TTE cache lines, and regenerate the TTEs if they are needed again later. However, frequently evicting and then regenerating large numbers of TTEs may significantly slow down program execution. In some embodiments, the system instead reserves a section of physical memory for TTEs, and writes evicted TTE cache lines back to this area. The operating system is aware of this physical memory region, and ensures that no normal data is ever written to this area. The system evicts a TTE cache line in the same manner that data lines are evicted from conventional caches, and can load the cache line back from memory as needed.

The system needs to be able to write back evicted TTE cache lines to this reserved memory region, and then subsequently find and restore these evicted TTE cache lines. A typical data line size for a physical memory is 64 bytes, which is the same size as the data portion of a cache line. However, simply writing the 64 bytes of the cache line back into a memory location is insufficient, because the system needs identifying information to confirm that it is loading a valid and matching cache line back into the unified cache (e.g., TTEs may change from being valid to invalid, and physical page locations may change, resulting in TTE tags that are variable and hence not suitable for identification purposes). The tag information for the cache line provides unique identifying information for a TTE cache line, because the tag includes bits from both the virtual address and the address space context. However, the combination of both the tag and the complete data portion of the cache line is larger than 64 bytes.

In some embodiments, the system uses the previously mentioned extra bits in the TTE fields of TTE cache lines to also store the tag of an evicted cache lines. The system can organize the reserved physical memory as a direct-mapped cache, and then use this tag to select an index in the reserved region for each cache line. Upon loading a stored cache line, the system can re-calculate this tag (and index) based on the referenced virtual address, and then compare the re-calculated tag with the tag in the stored cache line to ensure that the stored cache line matches the referenced virtual address. Note that the system can include a set of alternate wire paths that can selectively re-route the bits (between the unified cache and memory) so that the tag (and cache line in general) are written in a format that can easily be used as an index (when writing the cache line) and/or compared (during the load). Alternatively, the system can use a hash function on the tag, and then use the hashed result as an index.

Note that collisions may occur in the reserved portion of physical memory that stores evicted cache lines. The system may tune the size of this reserved area in an attempt to reduce these collisions, but while increasing the size of the reserved area can reduce the likelihood of collisions, it can also waste memory space. Hence, in the case of a collision, the system may simply discard one of the two colliding cache lines, and then regenerate the discarded cache line again later as needed.

In summary, embodiments of the present invention include a unified cache design that reduces inefficiency and redundancy by caching both TTEs and "normal" data (e.g., program instructions and program data) in a single, dynamically shared hardware resource. These techniques eliminate the need for a dedicated MMU cache structure, which simplifies the loading process for TTEs while allowing TTEs to share the benefits of a large on-chip associative cache structure. Multiple TTEs can be compressed into a single cache line with a shared tag, thereby providing some of the benefits of larger pages sizes. Dynamically sharing the unified cache among instructions, data, and TTEs allows the contents of the cache to automatically self-balance based on differing workloads.

Note that the described embodiments are fully compatible with per-core L1 TTE caches (also referred to as translation-lookaside buffers, or TLBs).

Computing Environment

In some embodiments of the present invention, the described unified cache structure can be incorporated into and/or accessed by a wide range of computing devices in a computing environment.

Figure 8:
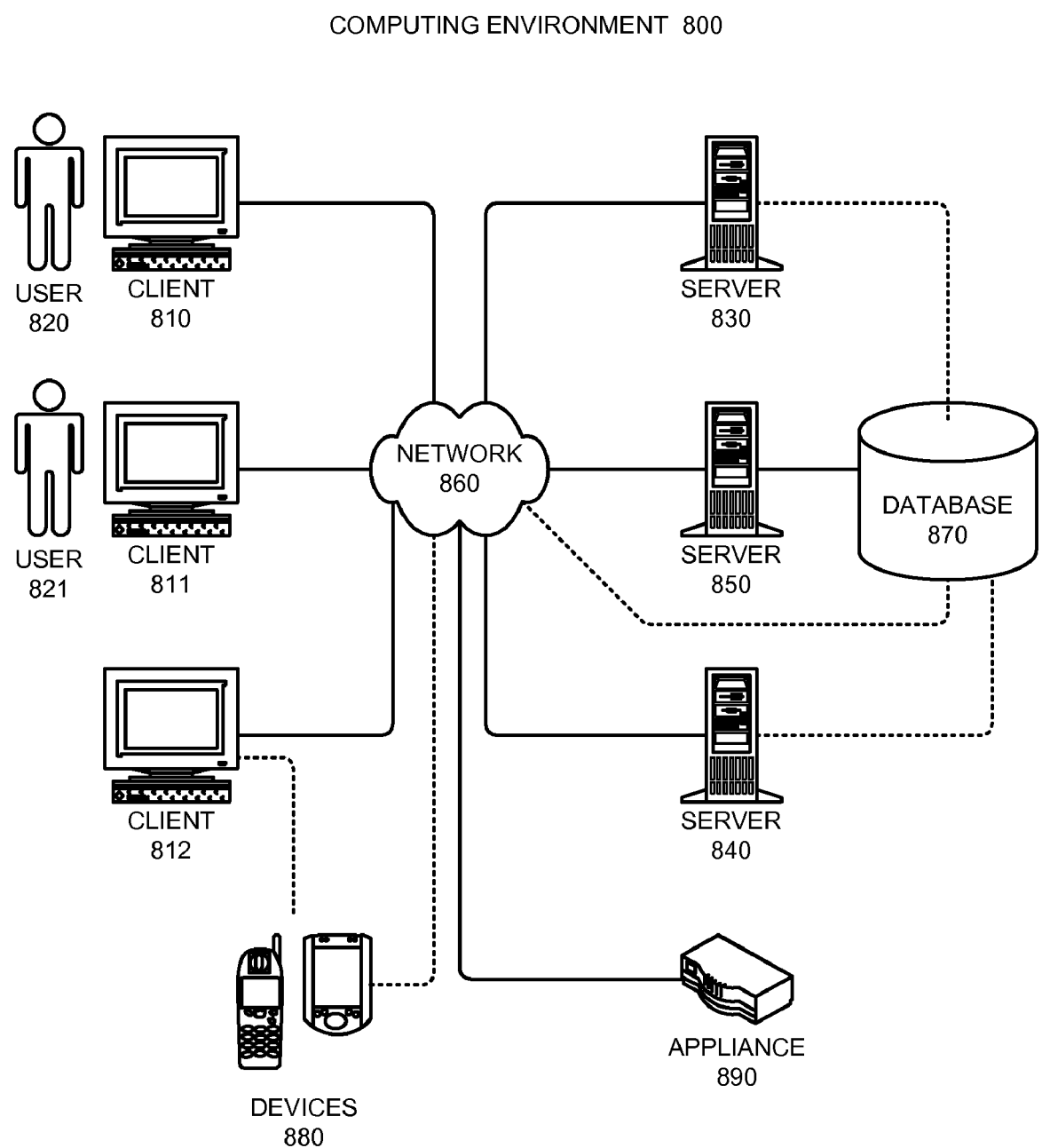
FIG. 8 illustrates a computing environment in accordance with an embodiment of the present invention.

FIG. 8 illustrates a computing environment 800 in accordance with an embodiment of the present invention. Computing environment 800 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 8, computing environment 800 includes clients 810-812, users 820 and 821, servers 830-850, network 860, database 870, devices 880, and appliance 890.

Clients 810-812 can include any node on a network that includes computational capability and includes a mechanism for communicating across the network. Additionally, clients 810-812 may comprise a tier in an n-tier application architecture, wherein clients 810-812 perform as servers (servicing requests from lower tiers or users), and wherein clients 810-812 perform as clients (forwarding the requests to a higher tier).

Similarly, servers 830-850 can generally include any node on a network including a mechanism for servicing requests from a client for computational and/or data storage resources. Servers 830-850 can participate in an advanced computing cluster, or can act as stand-alone servers. In one embodiment of the present invention, server 840 is an online "hot spare" of server 850.

Users 820 and 821 can include: an individual; a group of individuals; an organization; a group of organizations; a computing system; a group of computing systems; or any other entity that can interact with computing environment 800.

Network 860 can include any type of wired or wireless communication channel capable of coupling together computing nodes. This includes, but is not limited to, a local area network, a wide area network, or a combination of networks. In one embodiment of the present invention, network 860 includes the Internet. In some embodiments of the present invention, network 860 includes phone and cellular phone networks.

Database 870 can include any type of system for storing data in non-volatile storage. This includes, but is not limited to, systems based upon magnetic, optical, or magneto-optical storage devices, as well as storage devices based on flash memory and/or battery-backed up memory. Note that database 870 can be coupled: to a server (such as server 850), to a client, or directly to a network. In some embodiments of the present invention, database 870 is used to store information related to virtual machines and/or guest programs. Alternatively, other entities in computing environment 800 may also store such data (e.g., servers 830-850).

Devices 880 can include any type of electronic device that can be coupled to a client, such as client 812. This includes, but is not limited to, cell phones, personal digital assistants (PDAs), smart-phones, personal music players (such as MP3 players), gaming systems, digital cameras, portable storage media, or any other device that can be coupled to the client. Note that in some embodiments of the present invention, devices 880 can be coupled directly to network 860 and can function in the same manner as clients 810-812.

Appliance 890 can include any type of appliance that can be coupled to network 860. This includes, but is not limited to, routers, switches, load balancers, network accelerators, and specialty processors. Appliance 890 may act as a gateway, a proxy, or a translator between server 840 and network 860.

Note that different embodiments of the present invention may use different system configurations, and are not limited to the system configuration illustrated in computing environment 800. In general, any device that is capable of supporting virtual memory and/or the translation of virtual addresses to physical addresses may incorporate elements of the present invention.

Figure 9:
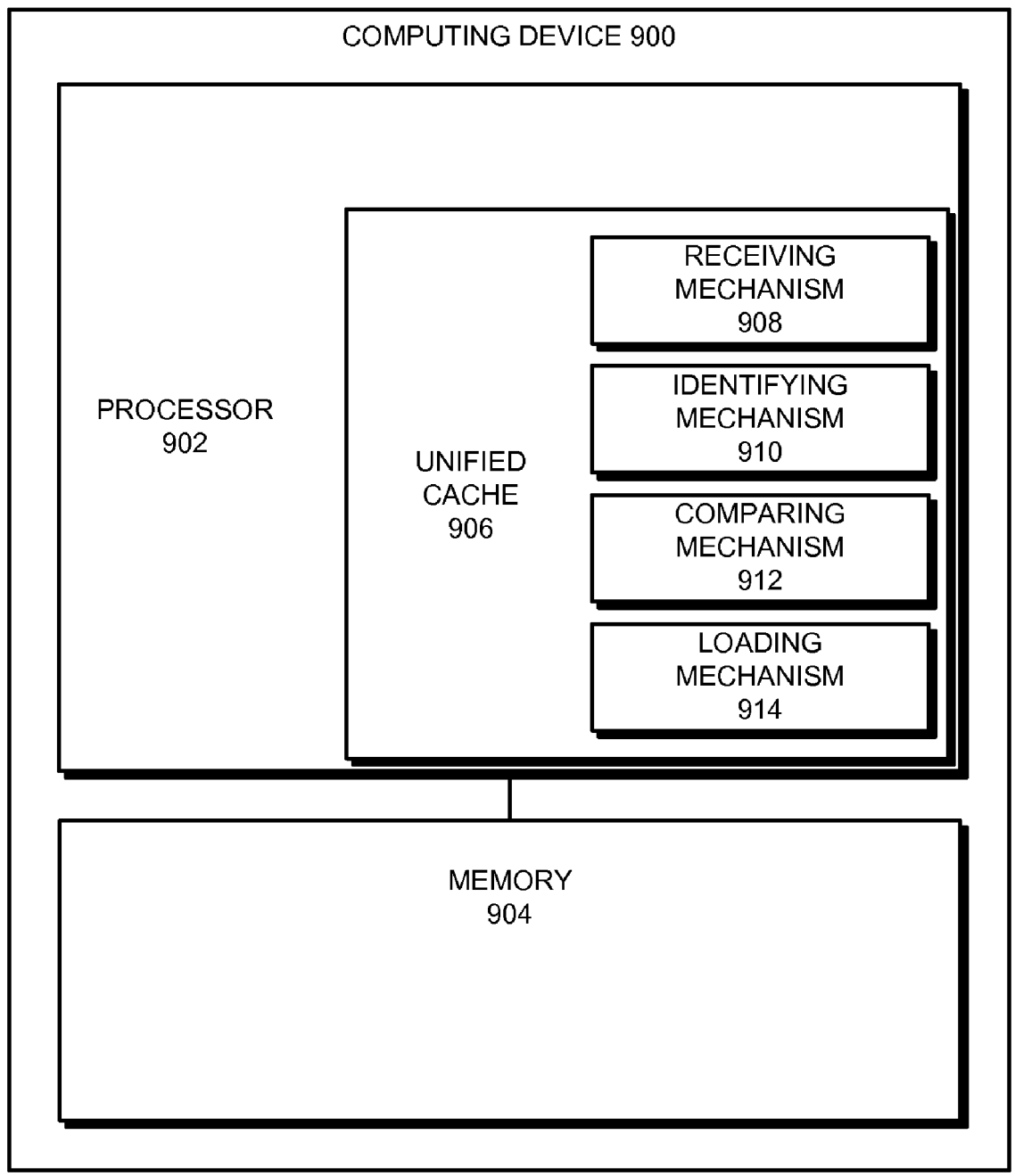
FIG. 9 illustrates a computing device that includes a unified cache structure in accordance with an embodiment of the present invention.

FIG. 9 illustrates a computing device 900 that includes a processor with a unified cache structure that facilitates accessing TTEs. Computing device 900 includes processor 902 and memory 904. Processor 902 includes a unified cache 906, which in turn includes receiving mechanism 908, identifying mechanism 910, comparing mechanism 912, and loading mechanism 914. During a memory access, receiving mechanism 908 receives a virtual memory address. Identifying mechanism 910 then uses this virtual memory address to identify one or more cache lines which are associated with the virtual memory address. Comparing mechanism 912 compares a tag portion of the virtual memory address with tags for the one or more identified cache lines to identify a cache line that matches for the virtual memory address. Loading mechanism 914 then loads a translation table entry for the virtual memory address from the matching cache line.

In some embodiments of the present invention, some or all aspects of unified cache 906, receiving mechanism 908, identifying mechanism 910, comparing mechanism 912, and/or loading mechanism 914 can be implemented as dedicated hardware modules in processor 902. For example, processor 902 can include one or more specialized circuits for performing the operations of the mechanisms. Alternatively, some or all of the operations of unified cache 906, receiving mechanism 908, identifying mechanism 910, comparing mechanism 912, and/or loading mechanism 914 may be performed using general-purpose circuits in processor 902 that are configured using processor instructions.

Although FIG. 9 illustrates unified cache 906, receiving mechanism 908, identifying mechanism 910, comparing mechanism 912, and/or loading mechanism 914 as being included in processor 902, in alternative embodiments some or all of these mechanisms are external to processor 902. For instance, these mechanisms may be incorporated into hardware modules external to processor 902. These hardware modules can include, but are not limited to, processor chips, application-specific integrated circuit (ASIC) chips, field-programmable gate arrays (FPGAs), memory chips, and other programmable-logic devices now known or later developed.

In these embodiments, when the external hardware modules are activated, the hardware modules perform the methods and processes included within the hardware modules. For example, in some embodiments of the present invention, the hardware module includes one or more dedicated circuits for performing the operations described below. As another example, in some embodiments of the present invention, the hardware module is a general-purpose computational circuit (e.g., a microprocessor or an ASIC), and when the hardware module is activated, the hardware module executes program code (e.g., BIOS, firmware, program code, etc.) that configures the general-purpose circuits to perform the operations described above.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for accessing a translation table entry from a unified cache structure, comprising:
   receiving a virtual memory address during a memory access;
   using the virtual memory address to identify one or more cache lines in the unified cache structure which are associated with the virtual memory address, wherein the unified cache structure simultaneously stores program instructions, program data, and translation table entries;
   comparing a tag portion of the virtual memory address with tags for the one or more cache lines to identify a cache line that matches for the virtual memory address; and
   loading a translation table entry for the virtual memory address from the identified cache line.

2. The method of claim 1,
   wherein tags in the unified cache structure include information from the virtual memory address and an address space context that facilitates confirming that the identified cache line contains translation table entries that match a current address space context; and
   wherein comparing the tag portion of the virtual memory address further involves comparing data for the current address space context with the tags of the one or more cache lines.

3. The method of claim 1, wherein a data portion of the identified cache line contains one of the following:
   one or more consecutive translation table entries; or
   program instructions or program data.

4. The method of claim 3, wherein loading the translation table entry from the identified cache line involves using one or more bits of the virtual memory address as an index into the one or more consecutive translation table entries in the data portion of the identified cache line.

5. The method of claim 3,
   wherein the method further involves accessing program instructions and program data from the unified cache structure; and
   wherein accessing program instructions and program data from the unified cache structure involves:
      translating the virtual memory address into a physical address;
      using the physical address to identify a second cache line; and
      loading data from the second cache line.

6. The method of claim 1, wherein if no cache line matches the virtual memory address, the method further involves:
   creating a new translation table entry for the virtual memory address;
   identifying a translation table entry (TTE) cache line for the new translation table entry; and
   writing the new translation table entry to the TTE cache line.

7. The method of claim 6,
   wherein a tag for the TTE cache line differs in format from the format of a tag for a cache line containing program instructions or program data; and
   wherein writing the tag for the TTE cache line and the new translation table entry involves using one or more special store instructions for translation table entries.

8. The method of claim 7,
   wherein one or more translation table entries in the TTE cache line may be updated individually; and
   wherein each translation table entry in the TTE cache line includes a valid bit.

9. The method of claim 1, where the method further involves automatically balancing portions of the unified cache structure dedicated to program instructions, program data, and translation table entries based on access patterns.

10. The method of claim 1, wherein the method further involves:
   using the unified cache structure in conjunction with a first-level processor cache for translation table entries; and
   wherein using the unified cache structure facilitates eliminating a dedicated memory management unit for translation table entries.

11. The method of claim 1, wherein the method further involves using the unified cache structure to store a short-lived translation table entry, thereby preventing the short-lived translation table entry from ever being written to memory.

12. The method of claim 11, wherein if the identified cache line containing the loaded translation table entry is evicted from the unified cache structure, the method further involves one or more of the following:
   discarding the evicted cache line and then later regenerating the loaded translation table entry; or
   storing the evicted cache line in a dedicated area of memory that is reserved for storing translation table entries that are evicted from the unified cache structure.

13. A computer-readable storage medium storing instructions that when executed by a computer cause the computer to perform a method for accessing a translation table entry from a unified cache structure, the method comprising:
   receiving a virtual memory address during a memory access;
   using the virtual memory address to identify one or more cache lines in the unified cache structure which are associated with the virtual memory address, wherein the unified cache structure simultaneously stores program instructions, program data, and translation table entries;

comparing a tag portion of the virtual memory address with tags for the one or more cache lines to identify a cache line that matches for the virtual memory address; and loading a translation table entry for the virtual memory address from the identified cache line.

14. A computing device that includes a processor with a unified cache structure that facilitates accessing a translation table entry, wherein the unified cache structure comprises:

a receiving mechanism configured to receive a virtual memory address during a memory access;

an identifying mechanism configured to use the virtual memory address to identify one or more cache lines which are associated with the virtual memory address;

a comparing mechanism configured to compare a tag portion of the virtual memory address with tags for the one or more cache lines to identify a cache line that matches for the virtual memory address; and a loading mechanism configured to load the translation table entry for the virtual memory address from the identified cache line;

wherein the unified cache structure simultaneously stores program instructions, program data, and translation table entries.

15. The computing device of claim 14, wherein tags in the unified cache structure include information from the virtual memory address and an address space context that facilitates confirming that the identified cache line contains translation table entries that match a current address space context; and wherein the comparing mechanism is configured to compare the tag portion of the virtual memory address further involves comparing data for the current address space context with the tags of the one or more cache lines.

16. The computing device of claim 14, wherein a data portion of the identified cache line contains one of the following:

one or more consecutive translation table entries; or program instructions or program data.

17. The computing device of claim 16, wherein one or more bits of the virtual memory address are used as an index into the one or more consecutive translation table entries in the data portion of the identified cache line when loading the translation table entry from the identified cache line.

18. The computing device of claim 14, wherein if no cache line matches the virtual memory address, the loading mechanism is further configured to:

create a new translation table entry for the virtual memory address;

identify a translation table entry (TTE) cache line for the new translation table entry; and write the new translation table entry to the TTE cache line.

19. The computing device of claim 18, wherein a tag for the TTE cache line differs in format from the format of a tag for a cache line containing program instructions or program data; and wherein writing the tag for the TTE cache line and the new translation table entry involves using one or more special store instructions for translation table entries.

20. The computing device of claim 14, wherein if the identified cache line containing the loaded translation table entry is evicted from the unified cache structure, the unified cache structure may:

discard the evicted cache line and then later regenerate the loaded translation table entry; or flush the evicted cache line to a dedicated area of memory that is reserved for storing translation table entries that are evicted from the unified cache structure.

* * * * *